United States Patent
Raut et al.

(10) Patent No.: US 10,812,370 B2
(45) Date of Patent: Oct. 20, 2020

(54) UNIFIED CONTROL PLANE OVER MPLS AND INTERNET INTERFACES THROUGH BGP

(71) Applicant: Arista Networks, Inc., Santa Clara, CA (US)

(72) Inventors: Devendra Raut, Cupertino, CA (US); James Murphy, Alameda, CA (US); Venkitraman Kasiviswanathan, San Ramon, CA (US)

(73) Assignee: Arista Networks, Inc., Santa Clara, CA (US)

( * ) Notice: Subject to any disclaimer, the term of this patent is extended or adjusted under 35 U.S.C. 154(b) by 41 days.

(21) Appl. No.: 16/054,396

(22) Filed: Aug. 3, 2018

(65) Prior Publication Data

US 2020/0044954 A1 Feb. 6, 2020

(51) Int. Cl.
| | | |
|---|---|---|
| *H04L 12/741* | (2013.01) | |
| *H04L 12/715* | (2013.01) | |
| *H04L 12/751* | (2013.01) | |
| *H04L 12/723* | (2013.01) | |
| *H04L 12/701* | (2013.01) | |

(52) U.S. Cl.
CPC .............. *H04L 45/04* (2013.01); *H04L 45/02* (2013.01); *H04L 45/50* (2013.01); *H04L 45/74* (2013.01); *H04L 45/00* (2013.01); *H04L 45/507* (2013.01)

(58) Field of Classification Search
CPC ....... H04L 45/02; H04L 45/74; H04L 45/023; H04L 45/50; H04L 45/507; H04L 45/586; H04L 49/70; H04L 45/04; H04L 45/00
See application file for complete search history.

(56) References Cited

U.S. PATENT DOCUMENTS

| | | | | |
|---|---|---|---|---|
| 2012/0069847 A1* | 3/2012 | Saad | ....................... | H04L 45/02 370/392 |
| 2014/0198794 A1* | 7/2014 | Mehta | ..................... | H04L 45/74 370/392 |
| 2015/0334011 A1* | 11/2015 | Zheng | ..................... | H04L 49/70 370/254 |
| 2016/0119229 A1* | 4/2016 | Zhou | ................... | H04L 12/4633 370/392 |
| 2017/0310589 A1* | 10/2017 | Tambakuwala | ....... | H04L 45/023 |
| 2018/0351882 A1* | 12/2018 | Jeganathan | ............. | H04L 45/02 |

OTHER PUBLICATIONS

D. Walton et al; "Advertisement of Multiple Paths in BGP"; RFC 7911, Standards Track; ISSN: 2070-1721; Jul. 2016 http://www.rfc-editor.org/info/rfc7911.

* cited by examiner

*Primary Examiner* — Jungwon Chang
(74) *Attorney, Agent, or Firm* — Chamberlain, Hrdlicka, White, Williams & Aughtry

(57) ABSTRACT

In general, embodiments relate to a method for processing packets in a network. The method includes receiving, by a first network element, a route comprising a first loopback address (LBA) associated with a second network element, and a loopback network layer reachability information (loopback NLRI) specifying the LBA and a plurality of interfaces on the second network element associated with the LBA. The method further includes receiving, by the first network element, a packet, making a first determination that the LBA is a next hop for the packet, based on the first determination, selecting a first interface of the plurality of interfaces, transmitting the packet towards the first interface.

20 Claims, 6 Drawing Sheets

UNIFIED CONTROL PLANE OVER MPLS AND INTERNET INTERFACES THROUGH BGP

BACKGROUND

Various mechanisms are used to configure network elements such that packets may be transmitted between the network elements in a secure manner. These traditional mechanisms are complex to setup and typically require a substantial administrative overhead to manage.

SUMMARY

In general, in one aspect, the invention relates to a method for processing packets in a network. The method includes receiving, by a first network element, a route comprising a first loopback address (LBA) associated with a second network element, and a loopback network layer reachability information (loopback NLRI) specifying the LBA and a plurality of interfaces on the second network element associated with the LBA, receiving, by the first network element, a packet, making a first determination that the LBA is a next hop for the packet, based on the first determination, selecting a first interface of the plurality of interfaces, transmitting the packet towards the first interface.

In general, in one aspect, the invention relates to a non-transitory computer readable medium (CRM) comprising computer readable program code, which when executed by a processor, enables the processor to: receive, by a first network element, a route comprising a first loopback address (LBA) associated with a second network element, and a loopback network layer reachability information (loopback NLRI) specifying the LBA and a plurality of interfaces on the second network element associated with the LBA, receive, by the first network element, a packet, making a first determination that the LBA is a next hop for the packet, based on the first determination, select an interface of the plurality of interfaces, transmit the packet towards the interface, wherein the route and the loopback NLRI are received using Border Gateway Protocol.

In general, in one aspect, the invention relates to a system for processing managing traffic in a network, the system comprising a first network element, comprising a processor, persistent storage, and memory, and configured to: receive: a route comprising a first loopback address (LBA) associated with a second network element, and a loopback network layer reachability information (loopback NLRI) specifying the LBA and a plurality of interfaces on the second network element associated with the LBA, receive a packet, making a first determination that the LBA is a next hop for the packet, based on the first determination, select an interface of the plurality of interfaces, transmit the packet towards the interface, wherein the route and the loopback NLRI are received using Border Gateway Protocol.

Other aspects of the invention will be apparent from the following description and the appended claims.

DETAILED DESCRIPTION

Figure 1:
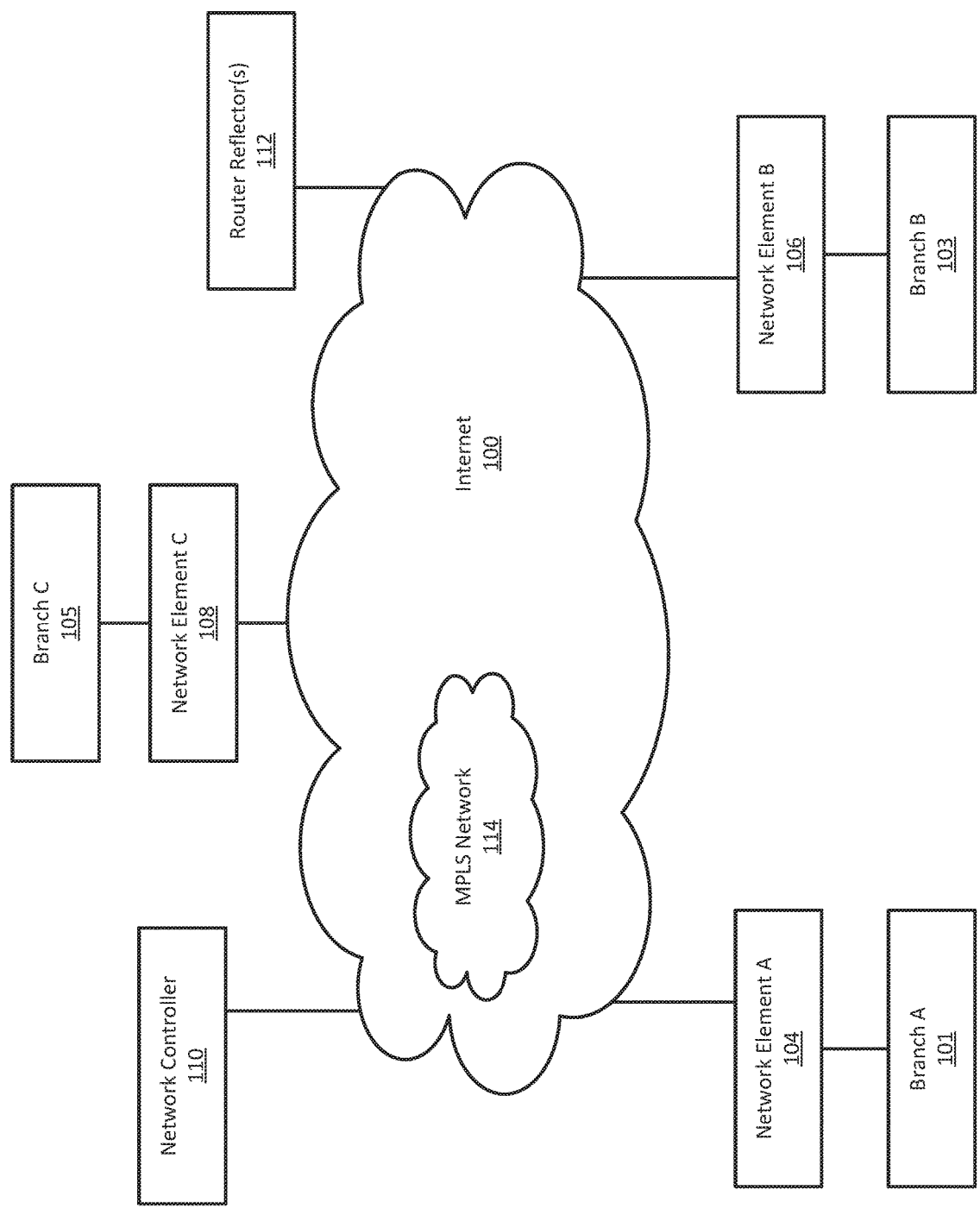
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6 any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a system and method for configuring and managing network elements. More specifically, embodiments of the invention implement a single, unified control plane for Internet and multiprotocol label switching (MPLS) interfaces for the network elements. In particular, embodiments of the invention relate to implementing the unified control plane using a routing protocol (e.g., Border Gateway Protocol) to efficiently advertise: routes, reachability of interfaces associated with the routes, and secure communication information (e.g., information necessary to establish a secure communication channel) between network elements. The use of the routing protocol to advertise the aforementioned information allows networks elements, each of which may have multiple interfaces, to dynamically create secure communication channels between various interfaces of the network elements with minimal configuration overhead.

FIG. 1 shows a system in accordance with one or more embodiments of the invention. The system includes one or more network elements (104, 106, 108) operatively connected over the Internet (100) and through a multiprotocol label switching (MPLS) network (114), a network controller (110) and a route reflector (112). The system further includes branches (101, 103, 105), each of which may be directly connected to one or more network elements (104, 106, 108). Each of these components is described below.

In one embodiment of the invention, a network element (104, 106, 108) may be a physical device that includes persistent storage, memory (e.g., random access memory (RAM), shared memory), one or more processor(s) (e.g., integrated circuits) (including a switch chip or network processor)), and two or more physical network interfaces or ports (hereafter referred to as "interface" or "interfaces"). The switch chip or network processor may be hardware that determines out of which egress port on the network element (104, 106, 108) to forward media access control (MAC) frames. The switch chip or network processor may include egress and ingress ports that may connect to the interfaces on the network element (104, 106, 108). Further, each interface may or may not be connected to a branch (e.g., 101, 103, 105) (or more specifically to a computing device (not shown) or network element (not shown) in the branch), to another network element (104, 106, 108) in the MPLS network (110), or to other network components (not shown) in the Internet (100). A network element (104, 106, 108) may be configured to receive packets via the interfaces, and determine whether to: (i) drop the packet; (ii) process the packet in accordance with one or more embodiments of the invention; and/or (iii) send the packet, based on the processing, out another interface on the network element (104, 106, 108) in accordance with one or more embodiments of the invention.

In one embodiment of the invention, the persistent storage on a network element (104, 106, 108) may include any type of non-transitory computer readable medium that includes instructions, which, when executed by the one or more processor(s), enable the network element (104, 106, 108) to perform any of the functionality described below in FIGS. 3-4 and may also include functionality to implement the MPLS protocol, Border Gateway Protocol (BGP), and BGP extensions such as ADD-PATH as defined in RFC 7911 (Advertisement of Multiple Paths in BGP). The functionality of the network elements is not limited to the aforementioned examples. Examples of a network element (104, 106, 108) include, but are not limited to, a switch, a router, and a multilayer switch. A network element (104, 106, 108) is not limited to the aforementioned specific examples. Additional detail about one or more embodiments of network elements is described below in FIG. 2.

In one embodiment of the invention, the MPLS Network (110) may be a set of interconnected network elements or systems (not shown), which are operatively connected the one or more network element(s) (104, 106, 108). The MPLS Network (110) includes functionality to facilitate communications between these aforementioned components using one or more routing protocols.

Figure 3:
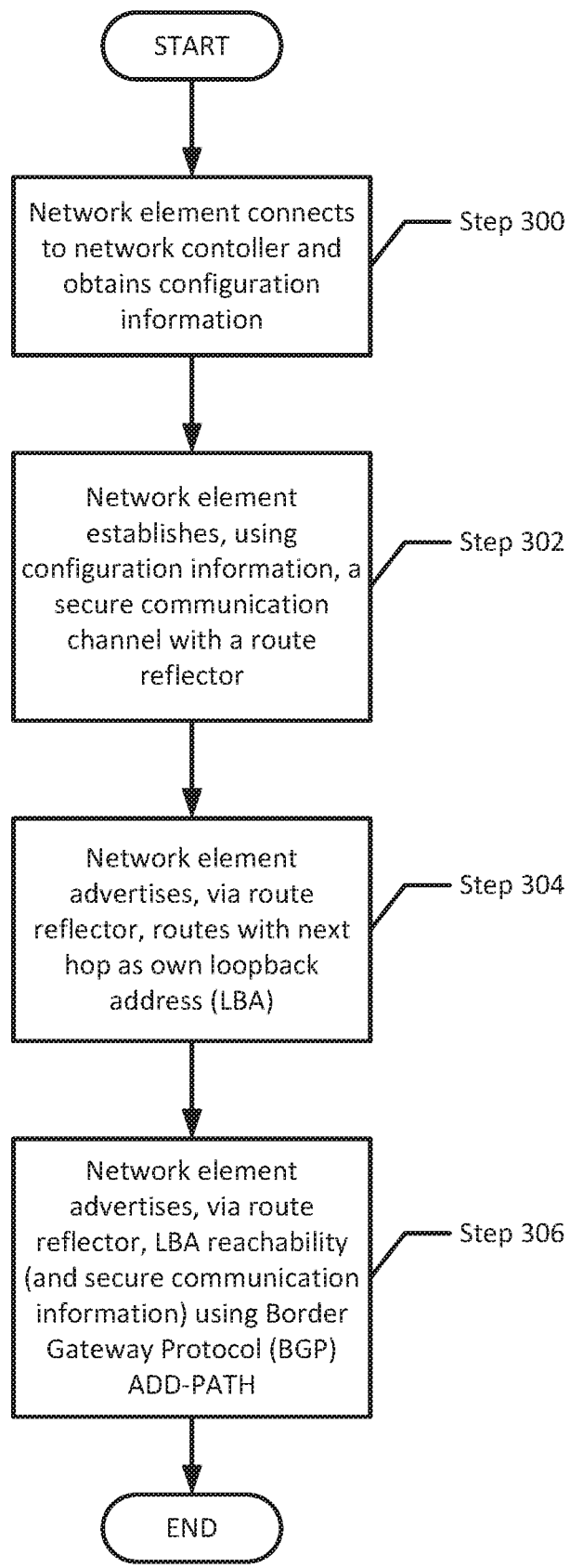
FIG. 3 shows a method for configuring a network element in accordance with one or more embodiments of the invention.
Figure 4:
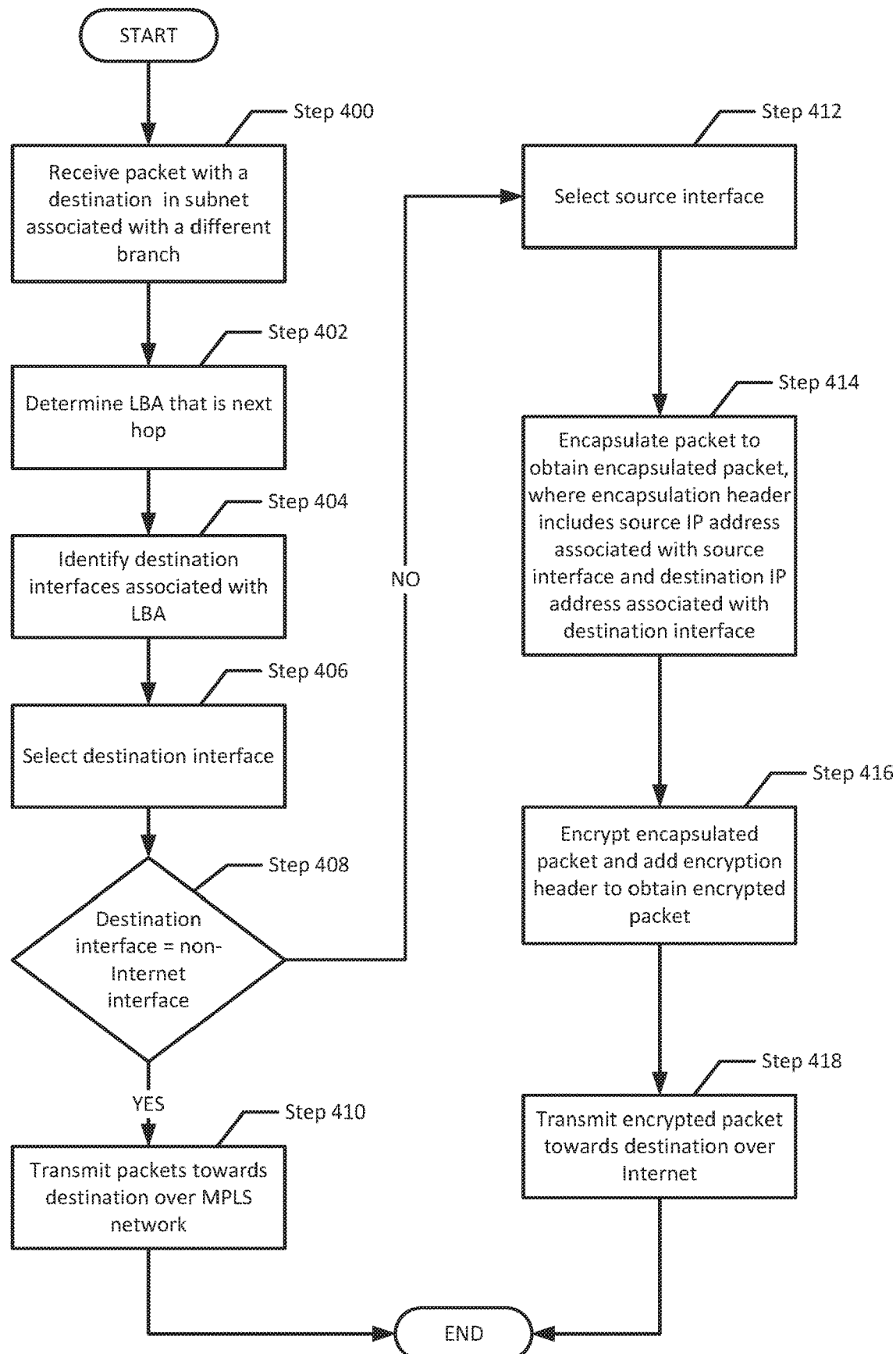
FIG. 4 shows a method for processing packets by a network element in accordance with one or more embodiments of the invention.

In one embodiment, the network controller (110) includes functionality to configure the network elements such that the network elements can perform all or a portion of the methods described in FIGS. 3-4. In addition, the network controller (110) obtains and/or maintains information that may be used to configure and/or manage the network element. In one or more embodiments of the invention, the network controller (110) may be implemented as a computing device (see e.g., FIG. 5), a network element, or another type of device that can store the aforementioned information, perform the aforementioned functions and communicate (directly or indirectly) with the network elements. In one embodiment of the invention, the network controller includes functionality to interact with the network elements as described in FIG. 3.

In one embodiment of the invention, the route reflector (112) is configured to receive routes from one or more network elements (e.g., 104, 106, 108) and to forward the received routes to the other network elements (e.g., 104, 106, 108). The route reflector may perform the aforementioned functionality in accordance with RFC 4456 (BGP Route Reflection: An Alternative to Full Mesh Internal BGP (IBGP), 2006). In one or more embodiments of the invention, the route reflector (112) may be implemented as a computing device (see e.g., FIG. 5), a network element, or another type of device that can perform the aforementioned functionality and communicate (directly or indirectly) with the network elements.

While FIG. 1 shows a configuration of components, other system configurations may be used without departing from the scope of the invention.

Figure 2:
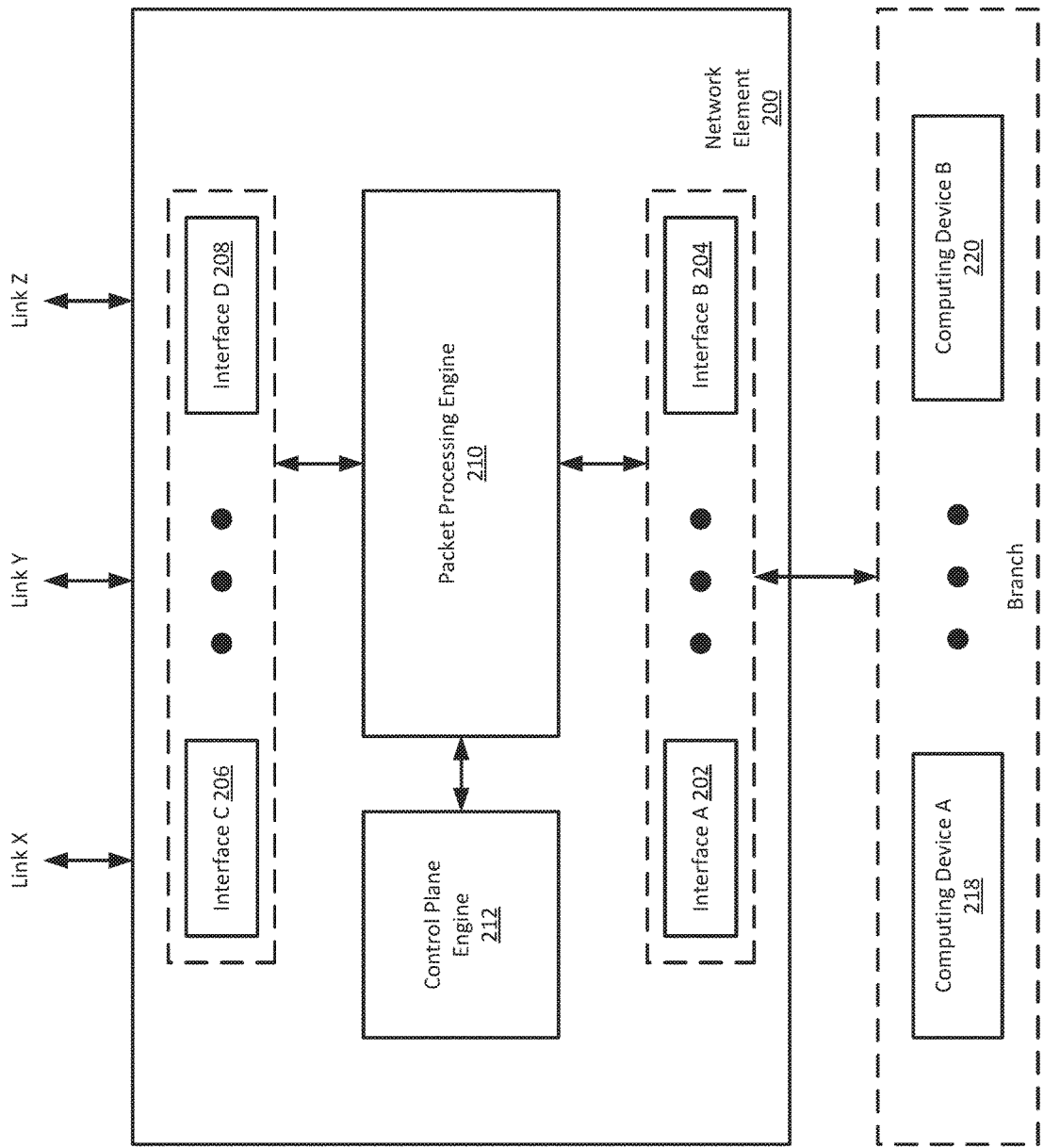
FIG. 2 shows a network element in accordance with one or more embodiments of the invention.

FIG. 2 shows a network element in accordance with one or more embodiments of the invention. The network element (200) includes interfaces (e.g., 202-208), a packet processing engine (210), and a control plane engine (212). Each of these components is described below.

In one embodiment of the invention, each interface (202-208) connects the network element (200) to the Internet (100), the MPLS Network (114), or to a computing device (218, 220) or network element (not shown) in a branch (216). The elements in the branch may include other network elements (not shown) and/or computing devices (see e.g., FIG. 5). The interfaces that connect the network element to the Internet are referred to as Internet interfaces and the interfaces that connect the network element to the MPLS network are referred to as MPLS interfaces. Each of the Internet interfaces is associated with a publicly routable Internet Protocol (IP) address. An IP address is deemed to be a publicly routable IP address when the IP address may be routable on over the Internet. In one embodiment of the invention, a publicly routable IP address may correspond to an IP address that is not part of the following IP address spaces: (i) 10.0.0.0-10.255.255.255, (ii) 172.16.0.0-172.31.255.255, and (iii) 192.168.0.0-192.168.255.255) (See e.g., RCE 1918—Address Allocation for Private Internets). Those skilled in the art will appreciate that other IP addresses may be publicly routable without departing from the invention. Continuing with the discussion of FIG. 2, each of the interfaces that connects to the Internet or the MPLS network is associated with a link (e.g., Link X, Link Y, Link Z), where each of the links is a logical or physical connection to a network element (not shown) in the Internet or MPLS network.

In one embodiment of the invention, the control plane engine (212) includes functionality to manage configuration of the network element. The configuration of the network element by the control plane engine may include performing all or a portion of the steps shown in FIG. 3. In order to perform the aforementioned functionality, the control plane engine may include functionality to obtain all or a portion of the information related to the routes and/or the loopback NLRI from the packet processing engine (or from other portions of the network element). In one embodiment of the invention, the packet processing engine (210) includes functionality to process packets in accordance with the method shown in FIG. 4. The control plane engine (212) and the packet processing engine (210) may be implemented using any combination of hardware and/or software.

While FIG. 2 shows a configuration of a network element, other configurations of the network element may be used without departing from the scope of the invention.

FIGS. 3-4 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3-4 may be performed in parallel with any other steps shown in FIGS. 3-4 without departing from the scope of the invention.

FIG. 3 shows a method for configuring a network element in accordance with one or more embodiments of the invention.

In step 300, the network element connects to the network controller and obtains configuration information. In one embodiment of the invention, the network element includes information, e.g., Internet Protocol (IP) address, authentication credentials, etc. to establish a connection with the network controller. After a connection is established with the network controller, the network controller provides the configuration information to the network element. The configuration information may include, but is not limited, instructions (which may be in the form of command line instructions (CLI)) and secure communication information (e.g., Internet Protocol Security (IPSec) information). In one embodiment of the invention, the secure communication information may include, but it not limited to, encryption keys as well as any other information required to establish a secure communication channel (e.g., an IPSec session).

In step 302, the network element, using the configuration information and the secure communication information, establishes a secure communication channel with the route reflector. More specifically, the network element may execute the instructions (i.e., the instructions included with the configuration information) to establish an IPSec session with a route reflector. Prior to the step 302, the route reflector is configured to communicate with one or more network elements over one or more secure channels.

In step 304, after the IPSec session has been established with the route reflector, the network element advertises one or more routes. At least one of the routes advertised specifies a prefix along with a loopback address (i.e., a loopback address (LBA) of the network element) as a next hop. The LBA may be specified by the control plane engine or by another component (which may be hardware or software component) in the network element. The routes may be advertised using Border Gateway Protocol (BGP). More specifically, the network element may use BGP in combination with a route reflector in order to distribute routes to other network elements. An example of route is provided below in the discussion of FIG. 6.

In step 306, the network element, via the route reflector, advertises LBA reachability (i.e., which interfaces on the network element are associated with the LBA) using BGP. In one embodiment of the invention, the LBA reachability is advertised using the BGP extension: ADD-PATH. The LBA reachability information is advertised as loopback network layer reachability information (NLRI). The loopback NRLI includes two primary components: (i) a listing of interfaces with which the LBA is associated and (ii) secure communication information (e.g., IPSec information). The listing of interfaces may include a set of interface identifiers (e.g., publicly routable IP addresses associated with each of the interfaces), which uniquely identify the interfaces on the network element. The secure communication information corresponds to encryption keys and other information that may be used by the network element to establish secure communication channels with other network elements. The secure communication information may be specified in the loopback NLRI as a transitive attribute. In one embodiment of the invention specifying the secure communication information as a transitive attribute ensures that the secure communication information is advertised, via BGP, to the other network elements. An example of a loopback NLRI is provided below in the discussion of FIG. 6.

Those skilled in the art will appreciate that steps 304 and 306 may be repeated in order to continue to advertise routes and loopback NLRI. For example, if the interfaces associated with the loopback address change, an updated loopback NLRI may be used to communicate an updated listing of interfaces associated with the loopback address.

FIG. 4 shows a method for processing packets by a network element in accordance with one or more embodiments of the invention.

In step 400, a packet is received by a network element. In one embodiment of the invention, the packet originated from a computing device in a first branch associated with a first subnet and is destined for a second branch associated with a second subnet.

In step 402, a loopback address is identified in response to a prefix look-up being performed on the destination IP address in the header of the packet. Prior to setup 402, a route with the loopback address is received by a network element from a route reflector and stored in the network element. The route may be used to update one or more routing tables in the network element. The prefix lookup may then be performed on the routing tables to obtain an entry that specifies the loopback address.

In step 404, one or more interfaces associated with the loopback address are identified. As discussed above, prior to step 402, a loopback NLRI that includes the listing of interfaces associated with the loopback address is received from a route reflector. Because the interfaces identified in step 404 are associated with the destination of the packet, they may be denoted as destination interfaces.

In one embodiment of the invention, steps 402 and 404 may be performed using recursive resolution on the loopback address in order to identify one or more interfaces (which may be Internet and/or MPLS interfaces).

In step 406, a destination interface from the list of destination interfaces is selected. The destination interface may be selected randomly, on a round-robin basis, based on whether the packet is to be transmitted over the Internet or over an MPLS network, based on the current traffic load on the destination interface, and/or based on any other factor(s). In one embodiment of the invention, the current traffic load per destination interface may be included in the loopback NLRI, e.g., as a transitive attribute.

In step 408, a determination is made about whether the selected destination interface is a MPLS interface. If the selected destination interface is a MPLS interface, then the process proceeds to step 410.

In step 410, when the selected destination interface is a MPLS interface, a source interface (i.e., an interface on the network element performing the method shown in FIG. 4) that is also a MPLS interface is selected. The packet is then transmitted to the MPLS nNetwork via the selected source interface. The process then ends.

Returning to step 410, when the selected destination interface is an Internet interface the process proceeds to step 412. In step 412, a source interface (i.e., an interface on the network element performing the method shown in FIG. 4) is selected. The source interface may be selected randomly, on a round-robin basis, based on the current traffic load on the source interface, and/or based on any other factor(s). In one embodiment of the invention, the current traffic load per source interface may be tracked by the network element and provided to (or is otherwise accessible to) the packet processing engine.

In step 414, the packet is encapsulated to obtain an encapsulated packet. The encapsulated packet includes an encapsulation header. The encapsulation header may include, among other elements, a source IP address associated with the source interface (selected in step 412) and a destination IP address associated with the destination interface (selected in step 406). As discussed above, the source IP address and the destination IP address are publicly routable IP addresses. In one embodiment of the invention, the encapsulation header is a VXLAN header.

In step 416, the encapsulated packet is encrypted to obtain an encrypted payload and an encryption header is added to the encrypted payload to generate an encrypted packet. Depending on the implementation of the invention, the encrypted payload may be generated by encrypting the entire encapsulated packet (e.g., when implementing in IPSec tunnel mode) or the encrypted payload may generated by only encrypting a portion of the encapsulated packet (e.g., when implementing in IPSec transport mode).

The generation of the encrypted payload and the encryption header is performed using the secure communication information included in the loopback NLRI previously received by the network element. In embodiment of the invention, the secure communication information used to generate the encrypted payload corresponds to the secure communication information in the loopback NLRI that includes the loopback address identified in step 402. In one embodiment of the invention the encrypted packet is an IPSec packet.

In step 418, the encrypted packet is then transmitted from the network element, via the source interface, over the Internet towards the destination interface.

In one embodiment of the invention, prior to step 400, an IPSec session is created. The creation of the IPSec session may occur when the network element receives the first loopback NLRI associated with a given loopback address. The IPSec session is then created between two network elements (i.e., the network element associated with the loopback address and the network element that received the loopback NLRI that specifies the loopback address). In this scenario, once the IPSec session is created, the IPSec session associated with the loopback address will remain active until there are no more routes that include the loopback address. In one embodiment of the invention, the information about routes and the corresponding loopback NLRI is maintained in a routing information base (RIB) (i.e., a data structure(s) in the network element). In such scenarios, the contents of the RIB may be used to determine when to create and/or remove the IPSec session.

In one embodiment of the invention, the encrypted packets generated and transmitted in step 416 and 418, respectively, are associated with the IPSec session created between the network elements (i.e., the network elements associated with the source interface and the destination interface).

Figure 5:
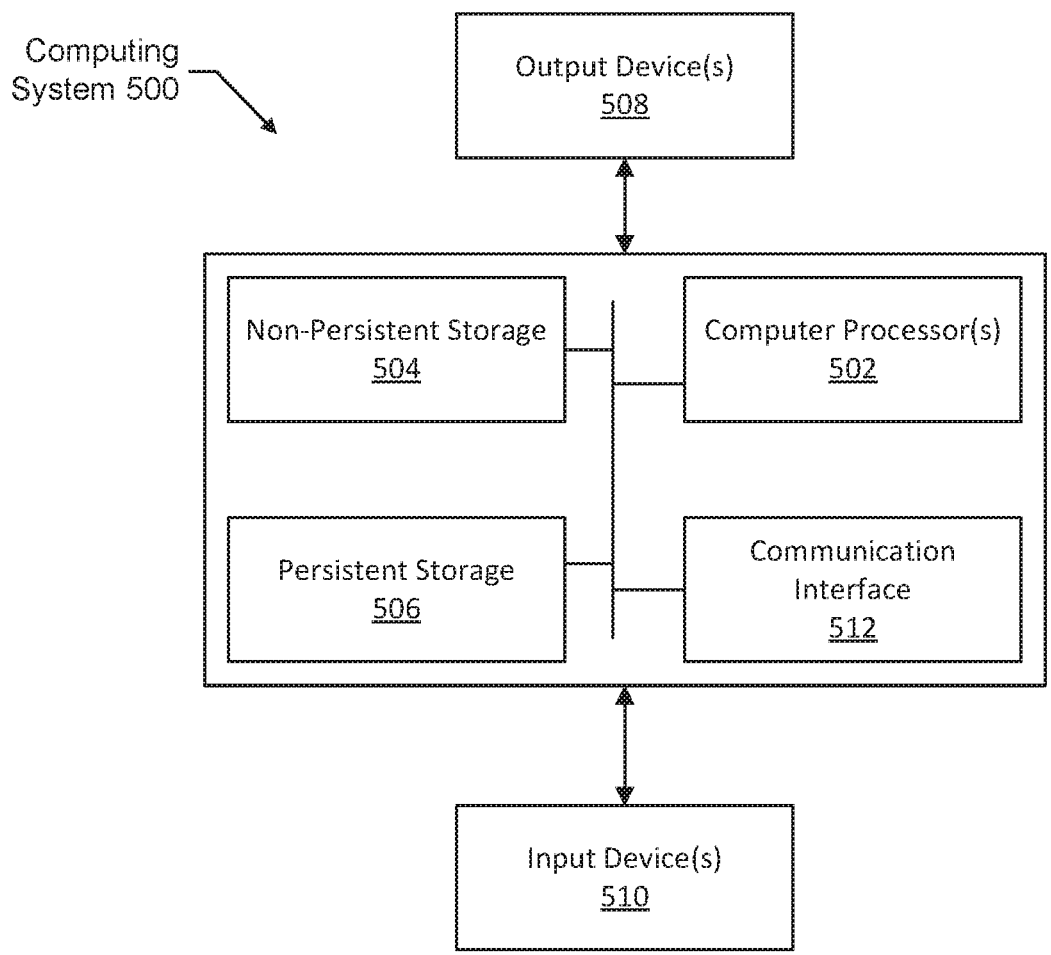
FIG. 5 shows a computing device in accordance with one or more embodiments of the invention.

FIG. 5 shows a computing system in accordance with one or more embodiments of the invention. For example, as shown in FIG. 5, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), one or more communication modules (512) (e.g., Bluetooth module, infrared module, network module (which may be wired or wireless), cellular module (e.g., an module that supports one or more cellular data communication protocols), optical module, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication module (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

In one embodiment of the invention, the computing device (500) may be any type of system (e.g., software and computer hardware) that is configured to generate, send, receive, and/or process requests and replies either locally or over a network using software and computer hardware. The computing device (500) may include functionality to generate, receive, and/or transmit MAC frames. Examples of a computing devices (500) may include, but are not limited to, a server (e.g., a database server, a dynamic host configuration protocol (DHCP) server, an application server, a file server, a print server, a mail server, or any other server), a desktop computer, a mobile device (e.g., a laptop computer, a smart phone, a personal digital assistant, a tablet computer, or any other mobile device), or any other type of computing device with the aforementioned minimum requirements.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention (including the embodiments described above in the example use case).

Example

Figure 6:
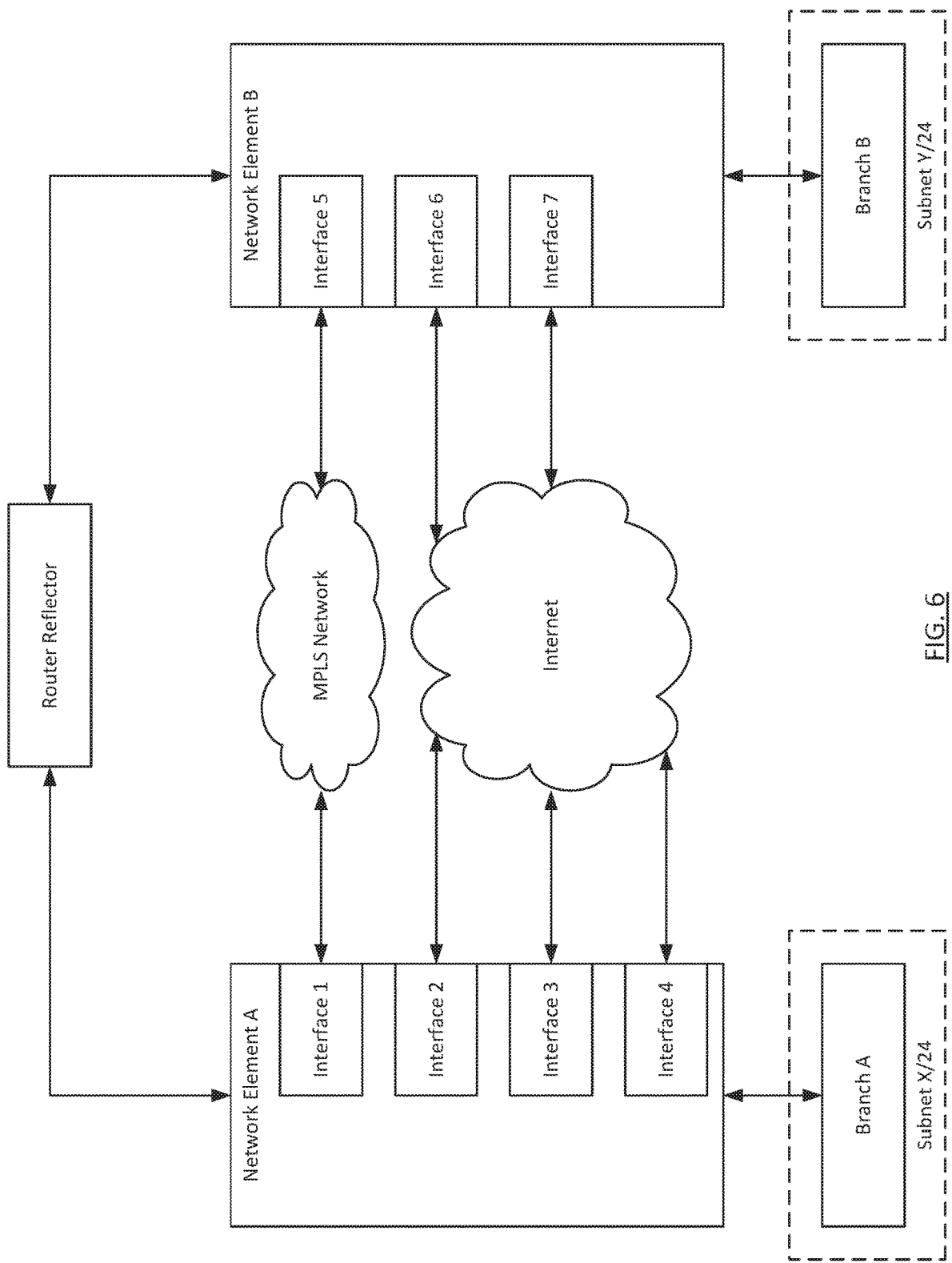
FIG. 6 shows an example in accordance with one or more embodiments of the invention.

FIG. 6 shows an example in accordance with one or more embodiments of the invention. The example is not intended to limit the scope of the invention.

Consider a scenario in which there are two branches: Branch A and Branch B, each connected to a network element (e.g., network element A, network element B), where each of the network elements is part of an MPLS network or connected to the Internet. More specifically, Branch A is associated with a first subnet X/24 and is connected to Network Element A and Branch B is associated with a second subnet Y/24 and is connected to Network Element B. Network Element A includes four interfaces, namely, interface 1 (MPLS interface), interface 2 (Internet interface), interface 3 (Internet interface), and interface 4 (Internet interface), and Network Element B includes three interfaces, namely, interface 5 (MPLS interface), interface 6 (Internet interface), and interface 7 (Internet interface).

Network Elements A and B are configured in accordance with the method shown in FIG. 3. Specifically, Network Elements A and B each connect to a network controller (not shown) and obtain configuration information. Using the configuration information, Network Elements A and B each individually establish an IPSec session with the route reflector.

Network Element A subsequently advertises (via the route reflector) route A with the following information: prefix: X/24 and next hop (NH): Loopback Address A (LBA 1) and a loopback NLRI A with the following information: LBA 1: Interface 1, Interface 2, Interface 3, Interface 4, IPSec information, (where Interface 2, Interface 3, Interface 4 may be specified as publicly routable IP addresses associated with the aforementioned interfaces).

Similarly, Network B subsequently advertises (via the route reflector) route B with the following information: prefix: Y/24 and NH: Loopback Address B (LBA 2) and a loopback NLRI B with the following information: LBA 2: Interface 5, Interface 6, ad Interface 7, IPSec information, (where Interface 6 and, Interface 7 may be specified as publicly routable IP addresses associated with the aforementioned interfaces).

After route A and NLRI A are received (via the route reflector) by Network Element B and route B and NLRI B are received (via the route reflector) by Network Element A, an IPSec session is created between Network Element A and Network Element B. The IPSec session is a shared IPSec session as it may be used for any encrypted packet transmission between any combination of Internet interfaces on Network Elements A and B.

Processing Packets for Transmission on the MPLS Network

After Network Elements A and B have been configured, assume that a packet is received by Network Element B from Branch B. The packet is processed in accordance with FIG. 4. Specifically, prefix lookup is performed using to the destination IP address in the packet. The result of the prefix lookup is an entry in a routing table specifying LBA1 as the next hop. Once LBA 1 is determined as a next hop, a second lookup is performed to determine the interfaces associated with LBA 1. In this example, interfaces 1, interfaces 2, interfaces 3, and interfaces 4 are associated with LBA 1. The packet processing engine (not shown) in Network Element B determines that the packet should be sent to interface 1 (i.e., interface 1 is the destination interface). As interface 1 is a MPLS interface, the packet processing engine selects interface 5 as the source interface (i.e., a MPLS Interface on Network Element B). The packet is subsequently encapsulated and the encapsulated packet is then transmitted out of interface 5 towards the MPLS network and, ultimately, to interface 1 on Network Element A.

Processing Packets for Transmission on the Internet

After Network Elements A and B have been configured, assume that a packet is received by Network Element B from Branch B. The packet is processed in accordance with FIG. 4. Specifically, prefix lookup is performed using to the destination IP address in the packet. The result of the prefix lookup is an entry in a routing table specifying LBA 1 as the next hop. Once LBA 1 is determined as a next hop, a second lookup is performed to determine the interfaces associated with LBA 1. In this example, interfaces 1, interfaces 2, interfaces 3, and interfaces 4 are associated with LBA 1. The packet processing engine (not shown) in Network Element B determines that the packet should be sent to interface 2 (i.e., interface 2 is the destination interface). As interface 2 is an Internet interface, the packet processing engine then selects, e.g., based on current traffic load of interfaces 6 and 7, interface 6 as the source interface. The packet is subsequently encapsulated and the encapsulated packet is then encrypted to obtain an encrypted packet. The encryption is performed using the IPSec information previously obtained in NLRI A. The encrypted packet, associated with the previously created IPSec session, is then transmitted out of interface 6 over the Internet towards interface 2 on Network Element A.

Embodiments of the invention may offer a variety of advantages. For example, one or more embodiments of the invention provide a mechanism to leverage BGP (along with BGP extensions) to transmit IPSec information and interface information between network elements. In addition, as the interface information on a given network element changes (e.g., a new interface becomes active or an interface is no longer available), this information may be efficiently transmitted to the other network element. Further, because the IPSec information is associated with a loopback address instead of being directly associated with individual interfaces, the IPSec session may continue to be used even though there may be changes in the individual interfaces that are associated with the loopback address. Said another way, using a loopback address creates a layer of abstraction that enables the implementation of full mesh IPSec communication between Internet interfaces on two separate network elements without requiring the Internet interfaces on each of the network elements to be statically defined.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing packets in a network, comprising:
   establishing, prior to receiving a route and loopback network layer reachability, information (loopback NLRI), a secure communication channel between a route reflector and a first network element;
   receiving, by the first network element over the secure communication channel:
      the route comprising a loopback address (LBA) associated with a second network element, and the loopback NLRI specifying the LBA and a plurality of interfaces on the second network element associated with the LBA;
receiving, by the first network element, a packet;
making a first determination that the LBA is a next hop for the packet;
based on the first determination, selecting a first interface of the plurality of interfaces;
transmitting the packet towards the first interface.

2. The method of claim 1, wherein the loopback NLRI further comprises secure communication information and wherein transmitting the packet towards the first interface comprises encrypting the packet using at least a portion of the secure communication information to generate an encrypted packet and transmitting the encrypted packet over the Internet towards the first interface.

3. The method of claim 2, wherein the secure communication information comprises Internet Protocol Security (IPSec) information.

4. The method of claim 1, wherein transmitting the packet towards the first interface comprises transmitting the packet over a multiprotocol label switching (MPLS) network towards the first interface.

5. The method of claim 1, wherein transmitting the packet towards the first interface comprises:
selecting a second interface from a second plurality of interfaces on the first network element; and
transmitting the packet over the Internet towards the first interface using the second interface.

6. The method of claim 5, wherein the first interface is associated with a first publicly routable Internet Protocol (IP) address and the second interface is associated with a second publicly routable IP address.

7. The method of claim 1, wherein the first interface is a multiprotocol label switching (MPLS) interface.

8. The method of claim 7, wherein the MPLS interface is operatively connected to MPLS network.

9. The method of claim 1, wherein the route and the loopback NLRI are obtained using Border Gateway Protocol.

10. The method of claim 1, wherein the first network elements one selected from a router.

11. The method of claim 1, wherein the first network element and the second network element are operatively connected over a multiprotocol label switching (MPLS) network and over the Internet.

12. The method of claim 1, wherein a first interface of the plurality of interfaces is associated with a multiprotocol label switching (MPLS) network.

13. The method of claim 12, further comprising:
establishing, using the plurality of interfaces, a unified control plane that enables the packet to be transmitted to the second network element via the MPLS network or an internet protocol network using a secure connection between the first network element and the second network element.

14. A non-transitory computer readable medium (CRM) comprising computer readable program code, which when executed by a processor, enables the processor to:
establish, prior to receiving a route and loopback network layer reachability information (loopback NLRI), a secure communication channel between a route reflector and a first network element;
receive, by the first network element over the secure communication channel:
the route comprising a first loopback address (LBA) associated with a second network element, and
the loopback NLRI specifying the LBA and a plurality of interfaces on the second network element associated with the LBA;
receive, by the first network element, a packet;
making a first determination that the LBA is a next hop for the packet;
based on the first determination, select an interface of the plurality of interfaces;
transmit the packet towards the interface.

15. The non-transitory CRM of claim 14, wherein the loopback NLRI further comprises Internet Protocol Security (IPSec) information and wherein transmitting the packet towards the interface comprises encrypting the packet using at least a portion of the IPSec information to generate an encrypted packet and transmitting the encrypted packet over the Internet towards the interface.

16. The non-transitory CRM of claim 14, wherein the interface of the plurality of interfaces is associated with a multiprotocol label switching (MPLS) network, wherein the computer readable program code further enables the processor to:
establish, using the plurality of interfaces, a unified control plane that enables the packet to be transmitted to the second network element via the MPLS network or an internet protocol network using a secure connection between the first network element and the second network element.

17. A system for processing traffic in a network; the system comprising:
a first network element, comprising a processor, persistent storage, and memory, and configured to:
establish, prior to receiving a route and loopback network layer reachability information (loopback NLRI), a secure communication channel between a route reflector and the first network element;
receive over the secure communication channel:
the route comprising a loopback address (LBA) associated with a second network element, and
the loopback NLRI specifying the LBA and a plurality of interfaces on the second network element associated with the LBA;
receive a packet;
making a first determination that the LBA is a next hop for the packet;
based on the first determination, select an interface of the plurality of interfaces;
transmit the packet towards the interface.

18. The system of claim 17, wherein the loopback NLRI further comprises Internet Protocol Security (IPSec) information and wherein transmitting the packet towards the interface comprises encrypting the packet using at least a portion of the IPSec information to generate an encrypted packet and transmitting the encrypted packet over the Internet towards the interface.

19. The system of claim 17,
wherein the first network element and the second network element are operatively, connected over a multiprotocol label switching network; and
wherein the interface is an Internet interface.

20. The system of claim 17, wherein the interface of the plurality of interfaces is associated with a multi protocol label switching (MPLS) network, wherein the first network element is further programmed to:
establish, using the plurality of interfaces, a unified control plane that enables the packet to be transmitted to the second network element via the MPLS network or an internet protocol network using the secure connection between the first network element and the second network element.

\* \* \* \* \*

UNITED STATES PATENT AND TRADEMARK OFFICE
CERTIFICATE OF CORRECTION

PATENT NO. : 10,812,370 B2
APPLICATION NO. : 16/054396
DATED : October 20, 2020
INVENTOR(S) : Devendra Raut, James Murphy and Venkitraman Kasiviswanathan Page 1 of 1

It is certified that error appears in the above-identified patent and that said Letters Patent is hereby corrected as shown below:

In the Claims

Column 12, Line 5 in Claim 14, the phrase "making a first determination" should read -- make a first determination --.

Column 12, Line 44 in Claim 17, the phrase "making a first determination" should read -- make a first determination --.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*